(12) United States Patent
Kuczynski et al.

(10) Patent No.: US 8,379,789 B2
(45) Date of Patent: Feb. 19, 2013

(54) NUCLEAR PLANT

(75) Inventors: Leszek Andrzej Kuczynski, Menlo Park (ZA); Francis Pieter Van Ravenswaay, Vanderbijlpark (ZA)

(73) Assignee: Pebble Bed Modular Reactor (Proprietary) Limited, Centurion (ZA)

( * ) Notice: Subject to any disclaimer, the term of this patent is extended or adjusted under 35 U.S.C. 154(b) by 0 days.

(21) Appl. No.: 13/191,627

(22) Filed: Jul. 27, 2011

(65) Prior Publication Data

US 2012/0027157 A1 Feb. 2, 2012

Related U.S. Application Data

(63) Continuation of application No. 11/605,929, filed on Nov. 29, 2006, now abandoned.

(30) Foreign Application Priority Data

May 30, 2004 (ZA) .................................. 2004/3297
May 13, 2005 (WO) ................. PCT/IB2005/051572

(51) Int. Cl.
*G21C 19/42* (2006.01)
*B03C 1/00* (2006.01)

(52) U.S. Cl. ........ 376/315; 376/314; 376/313; 376/310; 376/312; 376/305; 376/306; 209/214; 209/232; 209/223.2

(58) Field of Classification Search .................. 376/315, 376/313, 314, 310, 312, 305, 306; 209/214, 209/232, 223.2
See application file for complete search history.

(56) References Cited

U.S. PATENT DOCUMENTS

| | | | |
|---|---|---|---|
| 3,608,718 A * | 9/1971 | Aubrey et al. | 209/214 |
| 3,722,677 A | 3/1973 | Lehnert | |
| 3,772,519 A | 11/1973 | Levy et al. | |
| 3,887,457 A | 6/1975 | Martson et al. | |
| 3,929,433 A | 12/1975 | Lucero | |
| 4,094,762 A | 6/1978 | Clelland | |
| 4,107,524 A | 8/1978 | Book | |
| 4,251,372 A * | 2/1981 | Dolle | 210/222 |
| 4,678,627 A | 7/1987 | Rylatt | |
| 4,842,812 A * | 6/1989 | Panson et al. | 376/306 |
| 5,468,456 A * | 11/1995 | Nunez et al. | 423/10 |
| 7,027,549 B2 * | 4/2006 | Hemmi et al. | 376/313 |

FOREIGN PATENT DOCUMENTS

| | | |
|---|---|---|
| EP | 0196611 | 10/1986 |
| EP | 0705477 | 3/1997 |
| GB | 1 488 398 | 10/1977 |
| JP | 52001399 A | 1/1977 |
| JP | 53135877 A | 11/1978 |
| JP | 53136200 A | 11/1978 |
| JP | 54074100 A | 6/1979 |
| JP | 54083677 A | 7/1979 |
| JP | 04058200 A | 2/1992 |
| JP | 04340499 A | 11/1992 |
| WO | WO 95/00956 | 1/1995 |

* cited by examiner

*Primary Examiner* — Erin M Leach
(74) *Attorney, Agent, or Firm* — Brinks Hofer Gilson & Lione; G. Peter Nichols

(57) ABSTRACT

This invention relates to a nuclear plant having a reactor vessel and a fluid circuit including flow path defining means, defining a flow path for circulating a reactor coolant fluid from and to the reactor vessel. The nuclear plant includes a particle collection zone defined along at least part of the length of the flow path, and particle deflection means arranged in particle deflecting relationship with the flow path to deflect particles from a fluid stream in the flow path into or toward the particle collection zone.

1 Claim, 10 Drawing Sheets

NUCLEAR PLANT

This application is a continuation of U.S. application Ser. No. 11/605,929 filed Nov. 29, 2006, now abandoned, which claims priority to PCT application PCT/IB2005/051572 published as WO 2005/119698 in English on Dec. 15, 2005 and to South African application 2004/3297 filed May 30, 2004, the entire contents of each are incorporated herein by reference.

BACKGROUND OF THE INVENTION

This invention relates to a nuclear plant. The invention extends to a method of removing particles from a fluid stream.

SUMMARY OF INVENTION

According to one aspect of the invention, there is provided a nuclear plant having a reactor vessel and a fluid circuit including flow path defining means, defining a flow path for circulating a reactor coolant fluid from and to the reactor vessel, which nuclear plant includes a particle collection zone defined along at least part of the length of the flow path; and particle deflection means arranged in particle deflecting relationship with the flow path to deflect particles from a fluid stream in the flow path into or towards the particle collection zone.

The nuclear plant may include particle ionisation means disposed in the flow path upstream of the particle deflection means for ionising particles in the fluid stream. The particle ionisation means may include at least one ioniser selected from the group consisting of a neutron source, a photon source, a heat source and an electromagnetic radiation source, such as, for example, an X-ray emitter or a UV-emitter. It is to be appreciated that the reactor vessel comprises, in use, a heat source for ionisation of particles in the fluid stream.

In one embodiment of the invention, the particle collection zone is provided by at least one particle deposition bed defined on an internal surface of the flow path defining means.

At least part of a wall of the flow path defining means may then provide the/or each particle deposition bed. Instead, the/or each particle deposition bed may be provided by a deposition lining on the wall of the flow path defining means. The deposition bed may comprise a plurality of layers of particle diffusion-resistant material.

At least one layer of the deposition bed may be comprised of a fluid material. The nuclear plant may then include fluid material circulation means for circulating the fluid material such that fluid material can be removed from and replaced to the deposition bed. The fluid circulation means may include secondary particle removal means for removing particles collected in the fluid material therefrom, after removal of the fluid material from and prior to replacement of the fluid material to the deposition bed.

In another embodiment of the invention, the particle collection zone is defined by at least one magnetic trap, for trapping a charged particle in a magnetic field, provided on an internal surface of the flow path defining means. In this embodiment, a series of spaced magnetic traps may be provided at intervals on the internal surface of the flow path defining means.

More particularly, each magnetic trap may be defined as a peripherally extending channel on the internal surface of the flow path defining means. The/or each recess may have a magnetic internal wall.

The particle deflection means may be provided by a magnetic deflection arrangement, for generating a magnetic field in the flow path.

Preferably, the magnetic deflection arrangement generates a magnetic field of generally constant magnetic flux across a cross-sectional area transverse to a direction of flow of the fluid stream.

To this end, the magnetic deflection arrangement may include at least two pairs of opposed magnets arranged adjacent the flow path defining means, the magnets of a pair having inwardly disposed poles of opposite polarity and the pairs being arranged so as to have angularly off-set poles of like polarity. The poles of like polarity of the pairs of opposed magnets may be angularly off-set by between about 0 degrees and about 90 degrees, i.e. the angular orientation of a centre-line of each pair of opposed magnets may be varied relative to that of the at least one other pair of magnets. Preferably, the poles of like polarity of the pairs of opposed magnets are off-set by about 45 degrees or about 90 degrees.

Instead, or in addition, the magnetic deflection arrangement may include at least one toroidal magnet arranged around the flow path defining means.

The magnets may be permanent magnets. Instead, the magnets may be electromagnets.

According to another aspect of the invention, in a nuclear plant having a reactor vessel and a fluid circuit including flow path defining means, defining a flow path for circulating a coolant fluid from and to the reactor vessel, there is provided a method of removing charged particles from the coolant fluid, which method includes the steps of directing a coolant fluid stream containing charged particles along the flow path; applying a magnetic field across the flow path such that charged particles are deflected in the flow path; and collecting the deflected charged particles in a charged particle collection zone.

Collecting the charged particles will typically include retaining the collected particles in the collection zone.

Applying the magnetic field across the flow path may include arranging at least one permanent magnet in magnetic deflecting relationship with the flow path. Instead, applying the magnetic field across the flow path may include arranging at least one electromagnet in magnetic deflecting relationship with the flow path. Applying the magnetic field may then include pulsating the magnetic field.

Collecting the charged particles may include embedding the charged particles in a deposition material. The method may include, where the deposition material is a fluid material, removing and replacing fluid material in which particles have been collected. The method may include circulating the fluid material through secondary particle removal means to remove particles collected in the fluid material from the fluid material.

Instead, collecting the charged particles may include providing an endless passage and channeling the deflected charged particles therein.

Channeling the particles in the endless passage may include applying a magnetic field across the endless passage.

According to still another aspect of the invention, there is provided a particle deposition bed for the collection of particles, which deposition bed includes a body including one or more layers of at least one particle diffusion-resistant material selected from the group consisting of graphite, chromium, platinum, a chromium alloy, mercury, liquid sodium, silicon carbide, SiN, SiFC and diamond.

Typically, the chromium alloy is a specialty chromium alloy having particle diffusion-resistant properties.

Preferably the body comprises a first layer of graphite, a second layer of a material selected from the group consisting of chromium, platinum, a chromium alloy, mercury and liquid sodium and a third layer of a material selected from the group consisting of silicon carbide, SiN, SiFC and diamond. The second layer may provide an intermediate layer sandwiched between the first layer and the third layer.

In use, the first layer will typically provide an operatively inner layer and the third layer will typically provide an operatively outer layer.

The deposition bed may be provided on a base element on an operatively inner surface of said base element. Said base element may be tubular circular cylindrical and may be configured to provide part of a wall of flow path defining means, which forms part of a fluid circuit. The base element may be removably inserted into the fluid circuit to form part of the flow path defining means such that it can be removed, for replacement by a like base element having a fresh deposition bed, upon saturation of at least part of the deposition bed with embedded/collected particles.

According to yet another aspect of the invention, there is provided a magnetic trap arrangement for trapping charged particles, which trap arrangement includes a flow passage defining element defining a flow passage, for providing part of a flow path of a fluid circuit, and having at least one peripherally extending channel provided on an internal surface thereof, the at least one channel having a magnetic internal wall.

A series of longitudinally spaced peripherally extending channels may be provided on the internal surface of the flow passage defining element.

The flow passage defining element may be tubular circular cylindrical.

According to a further aspect of the invention, there is provided a method of removing particles from a fluid stream, which method includes the steps of deflecting particles from a fluid stream towards a particle deposition bed including at least one layer of fluid deposition material; collecting particles in the fluid deposition material; and removing and replacing the fluid deposition material of the particle deposition bed.

Preferably, the method includes circulating the fluid deposition material through secondary particle removal means for removing particles collected in the fluid deposition material from the fluid deposition material.

More particularly, the method may include circulating the fluid deposition material along a fluid material flow path through secondary particle removal means, including a particle collection zone, defined along the length of the fluid material flow path, and particle deflection means, arranged in particle deflecting relationship with the fluid material flow path, for deflecting particles from the fluid material into the particle collection zone.

Instead, or in addition, the method may include circulating the fluid deposition material along a fluid material flow path through secondary particle removal means, provided by a biofilter, for removing particles from the fluid deposition material by use of living organisms, typically bacteria.

The fluid deposition material may be provided by mercury or liquid sodium.

DESCRIPTION

The invention will now be described, by way of example, with reference to the accompanying diagrammatic drawings.

Figure 1:
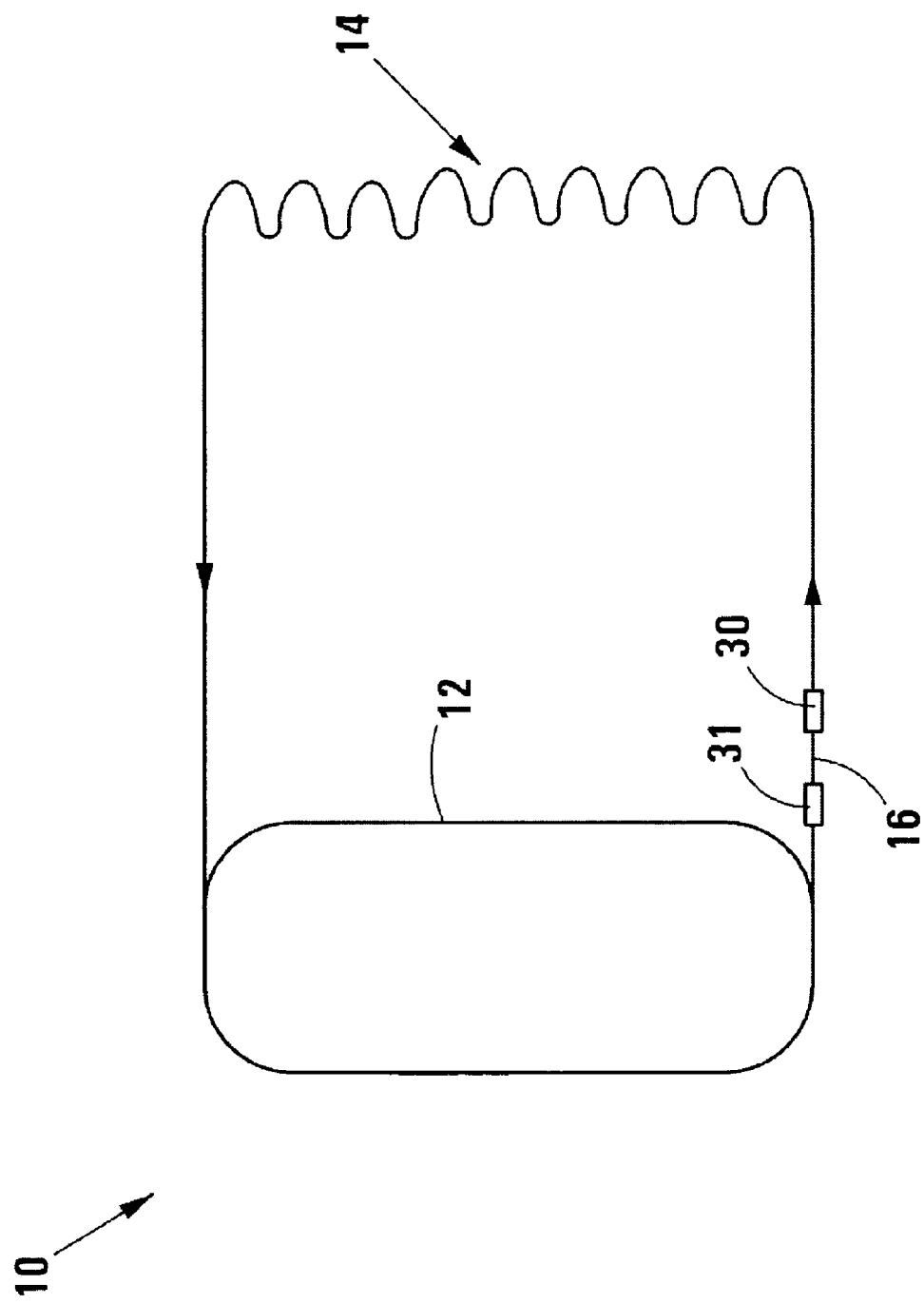
FIG. 1 shows a schematic view of a plant of a nuclear plant in accordance with the invention.

In FIG. 1 of the drawings, reference numeral 10 refers generally to part of a nuclear plant. The nuclear plant 10 includes a reactor vessel 12 and a fluid circuit, generally indicated by reference numeral 14, including flow path defining means 16, defining a flow path for circulating a reactor coolant fluid from and to the reactor vessel 12. Naturally, the plant 10 will include other components such as coolant fluid circulation means for circulating coolant fluid to and from the reactor vessel. However, details of these components are not required for an understanding of the invention and they are accordingly not shown in the drawings.

Figure 2:
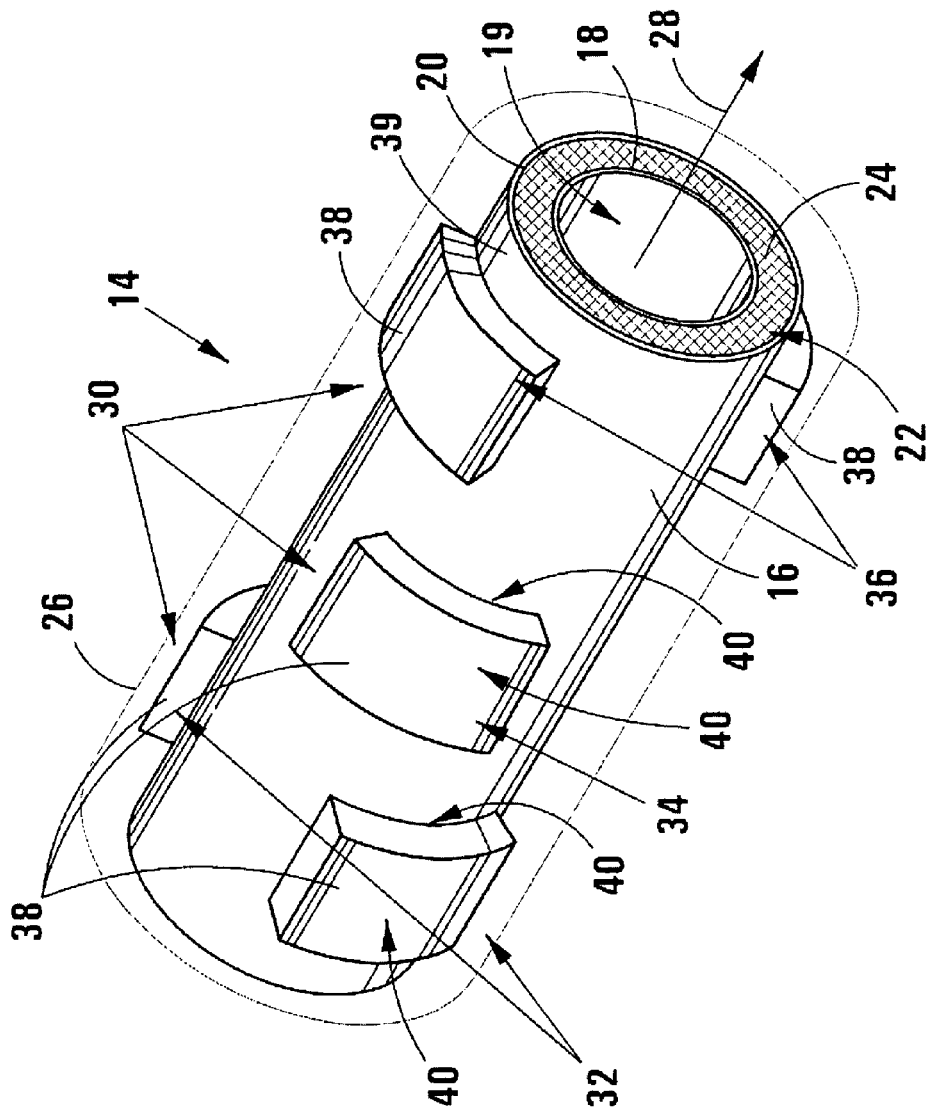
FIG. 2 shows a three-dimensional view of part of a fluid circuit of a nuclear plant in accordance with the invention.
Figure 3:
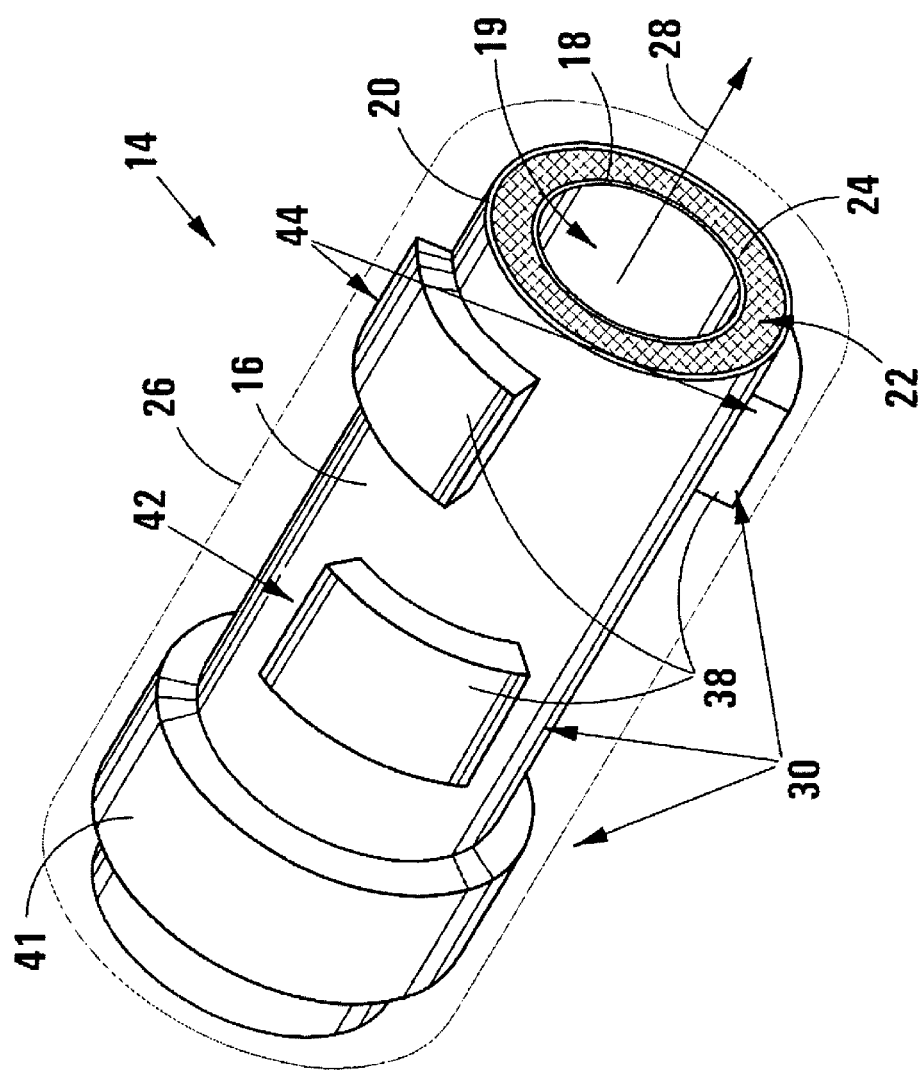
FIG. 3 shows a three-dimensional view of part of another fluid circuit of a nuclear plant in accordance with the invention.

Reference is now made to FIGS. 2 and 3 of the drawings, each of which depicts part of the fluid circuit 14 of FIG. 1 and, unless otherwise indicated, the same reference numerals used above are used to designate similar parts.

The flow path defining means 16 includes an inner circular cylindrical pipe 18, defining a flow path 19, and an outer circular cylindrical pipe 20, concentric and coaxial with the inner pipe 18. An annular cavity 22 is defined between the inner pipe 18 and the outer pipe 20 and a thermal insulating material 24 is interposed between the inner and outer pipes 18, 20 in the annular cavity 22.

An outermost tubular cylindrical pressure boundary wall 26 is arranged around the inner and outer pipes 18, 20, to be concentric and coaxial therewith.

Hot coolant gas from the reactor vessel 12 is conveyed, in use, in the direction of the arrow 28 (or in an opposite direction to the arrow 28) through the coolant fluid circuit 14 to drive a power turbine or steam generator or other power conversion device (not shown) and is cooled and compressed prior to being returned to the reactor vessel 12 via the fluid circuit 14. The hot coolant gas emanating from the reactor vessel 12 typically contains contaminants including, for example, ionised isotopes and radioisotopes, as well as other ions.

The nuclear plant 10 includes a magnetic deflection arrangement 30 for applying a magnetic field across the flow path 19 and generating a magnetic field in the flow path 19. The magnetic deflection arrangement 30 includes magnets arranged between the pressure boundary wall 26 and the outer pipe 20 at positions along the length of the flow path 19. In the embodiments of FIGS. 2 and 3 of the drawings, the magnets are permanent magnets (of a ceramic material incorporating rare earth metal(s)). It is to be appreciated, however, that the magnets may instead be electromagnets.

In one embodiment, the nuclear plant 10 includes particle ionisation means 31 (FIG. 1), including an ioniser such as a neutron or electromagnetic radiation source e.g. X-ray or UV emitter, disposed in the flow path 19 upstream of the magnetic deflection arrangement 30, i.e. between an outlet of the reactor vessel 12 and the magnetic deflection arrangement 30. The ionisation means 31 increases the number of charged particles in the fluid stream at the position along the length of the flow path 19 at which the magnetic deflection arrangement 30 is provided, by ionisation of the particles conveyed in the fluid stream prior to their conveyance through that part of the flow path defining means 16 at which the magnetic deflection arrangement 30 is provided.

In FIG. 2, the magnetic deflection arrangement 30 includes three pairs 32, 34, 36 of ring segment magnets 38 arranged adjacent to an outer wall 39 of the outer pipe 20 at longitudinally spaced positions. The magnets 38 of each pair 32, 34, 36 are located at diametrically positions and are arranged such that poles 40 of opposite polarity of the magnets 38 of any pair 32, 34, 36 face inwardly and outwardly, respectively. In this way, each pair of magnets 32, 34, 36 comprises a magnet 38 having an outwardly-directed north pole and an inwardly-directed south pole, and an opposed magnet 38 having an outwardly-directed south pole and an inwardly directed north pole.

The poles 40 of the magnets 38 of each pair 32, 34, 36 are angularly off-set from the poles 40 of the magnets 38 of each other pair 32, 34, 36. Preferably, as shown in FIG. 2, the poles 40 of the magnets 38 of the pairs 32 and 34, and 34 and 36, respectively, are off-set by about 45 degrees. Hence, the poles 40 of the magnets 38 of the pair 36 are off-set by about 90 degrees relative to those in the pair 32. The Inventors are of the view that magnetic fields of approximately constant magnetic flux will be obtained over the cross-section of the pipe 18 at each pair 32, 34, 36 of opposing magnets. Naturally, the poles 40 of the magnets 38 of the pairs 32, 34, 36 may be angularly off-set by other magnitudes of angle.

Reference is now made to FIG. 3 of the drawings, in which the magnetic deflection arrangement 30 includes a toroidal magnet 41 arranged around the outer pipe 20. The magnetic deflection arrangement further includes two pairs 42, 44 of magnets 38, similar to the pairs of magnets 32, 34, 36 of FIG. 2, the pairs 42, 44 and magnet 40 being longitudinally spaced along the outer pipe 20, between the pressure boundary wall 26 and the outer pipe 20.

The magnetic deflection arrangement 30 generates a magnetic field in the flow path 19 such that a particle having a charge, such as an ion in the coolant fluid stream, and moving with a velocity through the magnetic field will experience a force (a Lorentz force) and be deflected from its path of travel towards an internal surface of the inner pipe 18.

Figure 4:
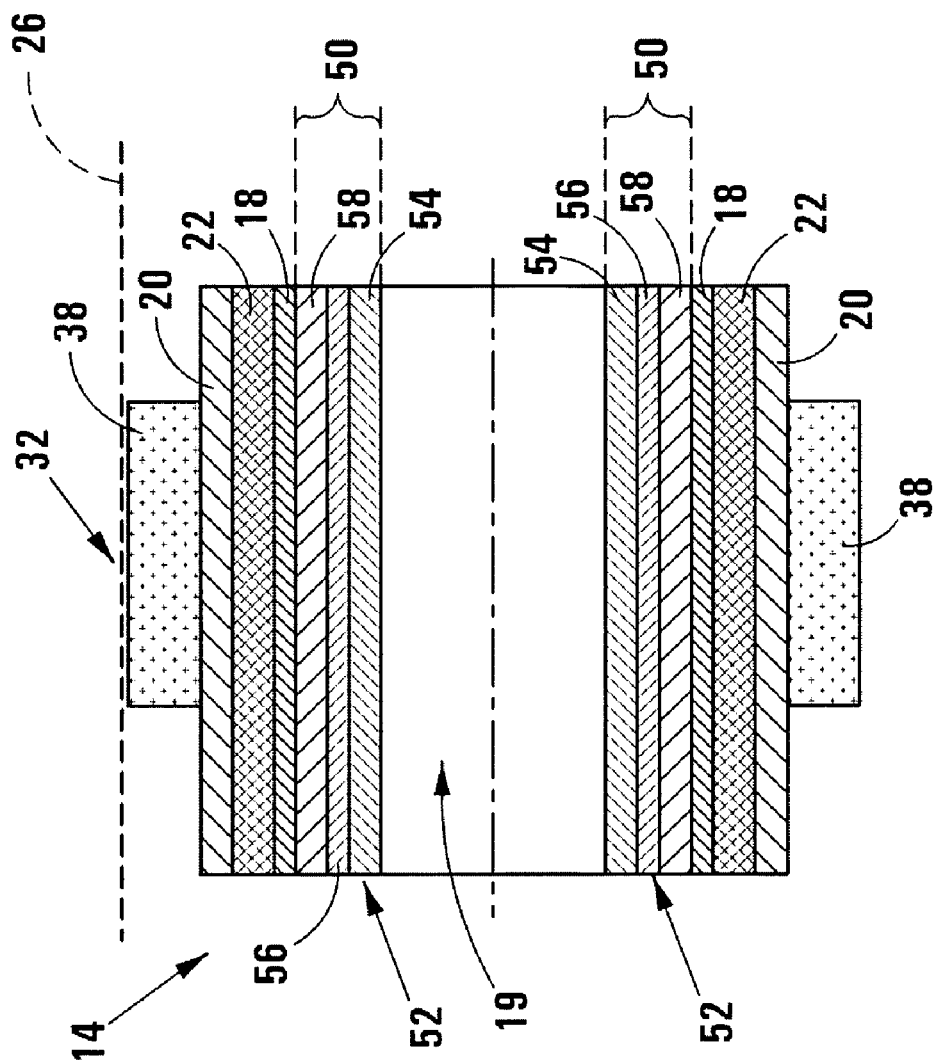
FIG. 4 shows a longitudinal sectional view of part of the fluid circuit of a nuclear plant in accordance with the invention.

FIG. 4 of the drawings shows part of the flow path defining means 16 of the fluid circuit 14 in longitudinal cross-section and, unless otherwise indicated, the same reference numerals used above are used to designate similar parts. An internal surface of the inner pipe 18, defining the flow path 19, has a deposition lining 50 provided thereon. The deposition lining 50 defines a particle deposition bed 52 which provides a collection zone into which charged particles, e.g. ionised isotopes, can be deflected and embedded (ie. collected and retained) thereby to be removed from the coolant fluid stream.

The deposition lining 50 comprises a plurality of layers of materials, which resist particle diffusion therethrough. In a preferred embodiment, the lining 50 includes a radially innermost layer 54 of graphite, defining a charged particle landing zone and providing a decelerator for the charged particles.

The layer 54 may, however, instead be comprised of any other suitable soft temperature-resistant material. An intermediate layer 56 of chromium is sandwiched between the graphite layer 54 and an outer layer 58 of silicon carbide. The chromium layer 56 provides a trap for silver atoms/ions, which exhibit an affinity for chromium. Instead of chromium, platinum or an alloy resistant to radiation damage, such as a Specialty Chromium Alloy, may be used. The material of the layer 56 typically attracts captured charged particles through the layer 54 of graphite, or other soft material, into the layer 56. The silicon carbide provides an outer barrier layer 58 for inhibiting diffusion of ionised isotopes and other ions through the wall of the inner pipe 18. Instead of silicon carbide, the outer layer 58 may be comprised of SiN, SiFC or diamond.

That part of the inner pipe 18 having the deposition lining 50 provided thereon (illustrated in FIG. 4) may be comprised by a tubular circular cylindrical base element providing a pipe segment, which is removably inserted into the fluid circuit 14 to form part of the flow path defining means 16. The pipe segment/base element may thus be removed during shutdown or reactor maintenance, typically when the deposition lining 50 is saturated with embedded charged particles, and replaced with another like pipe segment/base element having a fresh deposition lining 50 for particle collection. Saturation of the deposition lining 50 may be determined, for example, on a pre-calculated fixed term basis (i.e. after expiration of a predetermined number of hours of reactor operation) or by active measurement of a saturation level of the deposition lining 50. The removed pipe segment/base element will typically be stored on a long term basis.

In another embodiment of the invention, the intermediate layer 56 is of a fluid material, such as, for example, mercury or liquid sodium. The nuclear plant 10 then typically will include means (not shown) for removing the fluid material of the layer 56 from the deposition lining 50 and providing substitute fluid material therefor or returning the fluid material to the deposition lining 50. Where the fluid material is removed from the deposition lining 50 to be returned thereto, the nuclear plant 10 will typically include fluid material circulation means (not shown), defining a fluid material flow path, for circulating the fluid material, via secondary particle removal means (not shown), from and to the deposition lining 50. The secondary particle removal means will serve to remove particles collected in the fluid material of the layer 56 from the fluid material during circulation thereof, so that fluid material returned to the deposition lining 50 is purged of particle contaminants. The Applicant believes that this will result in an increased lifetime of the deposition lining 50 and reduce the need for shutdown or maintenance of the nuclear plant 10 in order to replace the deposition lining 50 due to saturation with embedded particles. The secondary particle removal means may be provided, for example, by a particle collection zone, defined along the length of the fluid material flow path, and particle deflection means (typically a magnet arrangement) arranged in particle deflecting relationship with the fluid material flow path to deflect particles from the fluid material into the particle collection zone. Instead, the secondary particle removal means may be provided by a biofilter, for removing particles from the fluid deposition material by use of living organisms, typically bacteria, which, for example, may consume the contaminant particles.

Figure 5:
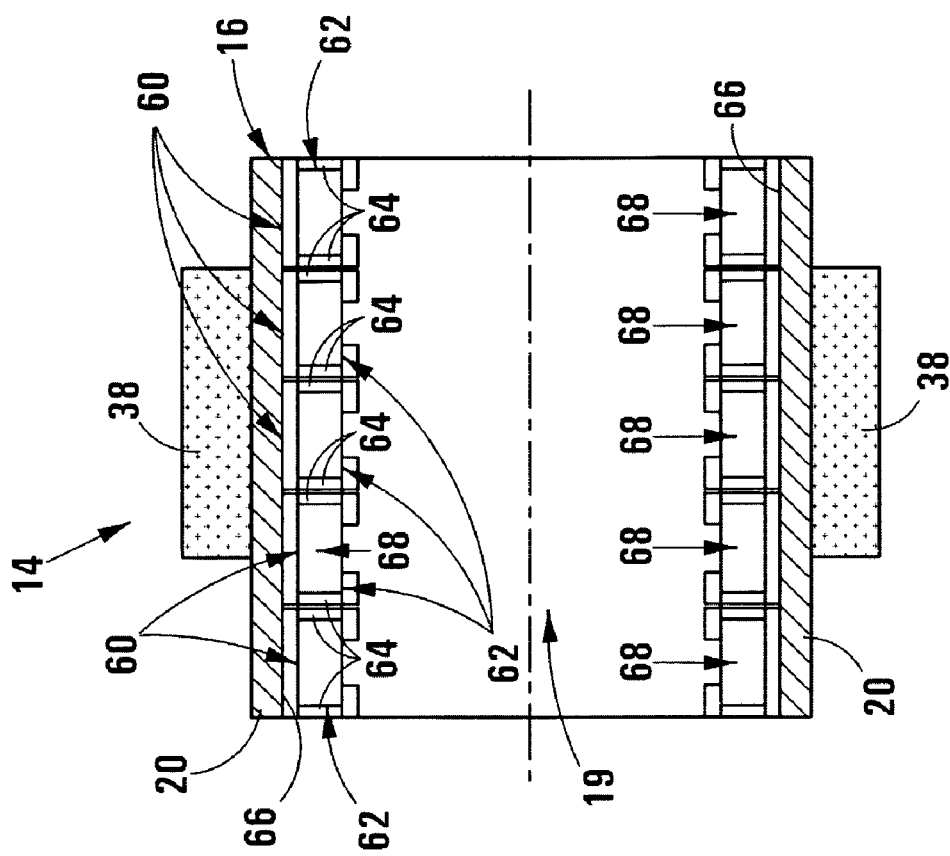
FIG. 5 shows a longitudinal sectional view of part of another fluid circuit of a nuclear plant in accordance with the invention.

In the embodiment of the invention shown in FIG. 5 of the drawings, in which the same reference numerals used above designate similar parts, a charged particle collection zone is defined by a series of longitudinally spaced magnetic traps 60, provided on an internal surface of the flow path defining means 16. Here, the inner pipe 18 is omitted from that part of the fluid circuit 14 in which the particle collection zone is provided. In the embodiment shown, each magnetic trap 60 is provided by a channel-section ring formation 62, having magnetic internal walls 64. The ring formations 62 are arranged in side-by-side longitudinally spaced relationship against an internal surface 66 of the outer pipe 20 so as to extend circumferentially around the outer pipe 20 and define longitudinally spaced peripheral channels 68, each providing an endless passage, along the flow path defining means 16. The channels 68 are lipped. A magnetic field is generated within each channel 68 by the magnetic internal walls 64 thereof such that a charged particle deflected into a channel 68, by the magnetic field applied across the flow path 19, will be displaced along the endless passage under the influence of the magnetic field of the channel 68 and will thereby be trapped in the relevant channel 38.

The flow path defining means will typically have an internal diameter of between about 1 metre and about 1.5 metres. Typically, the deposition bed 52, or, alternatively, the arrangement of channels 68, will extend for a length of between about 2 times to about 5 times the internal diameter, i.e. in the present embodiment extending for about 4 metres, along the length of the flow path defining means, and will be positioned as close as possible to an outlet from the reactor vessel 12.

Figure 6:
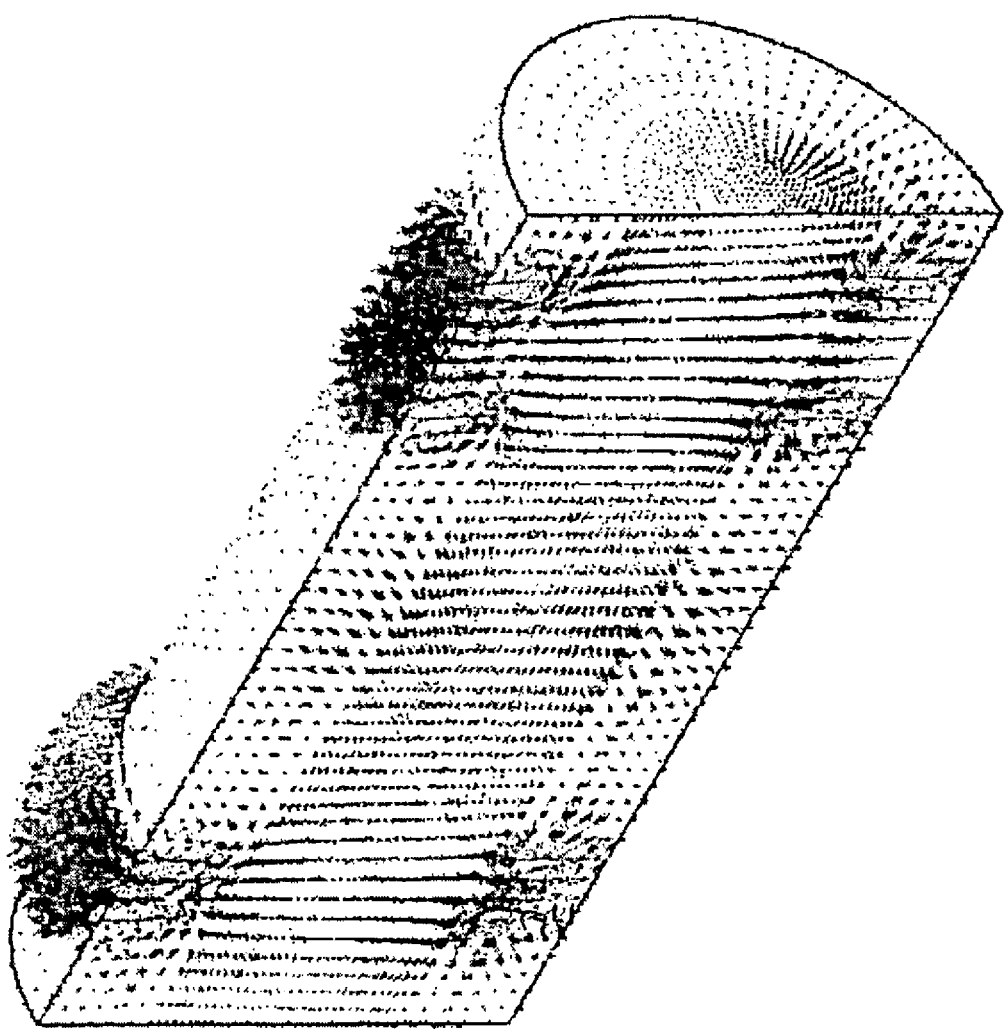
FIG. 6 shows a schematic view of a magnetic field applied across the part of a fluid circuit of FIG. 3 in three-dimensional longitudinal section.
Figure 7:
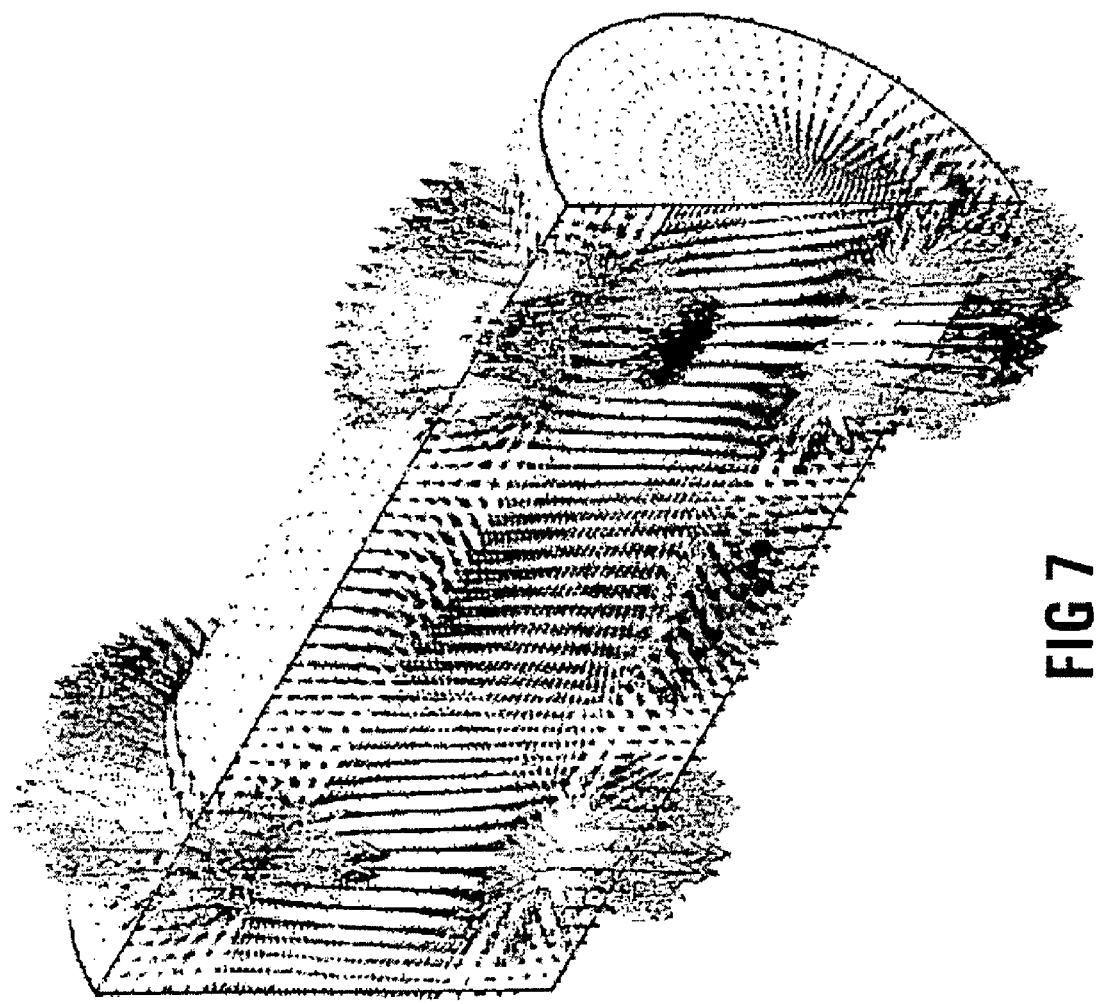
FIG. 7 shows a schematic view of a coercive force field applied across the part of a fluid circuit of FIG. 3 in three-dimensional longitudinal section.
Figure 8:
FIG. 8 shows a three-dimensional view of charged particle deflections in the part of a fluid circuit of FIG. 3.
Figure 9:
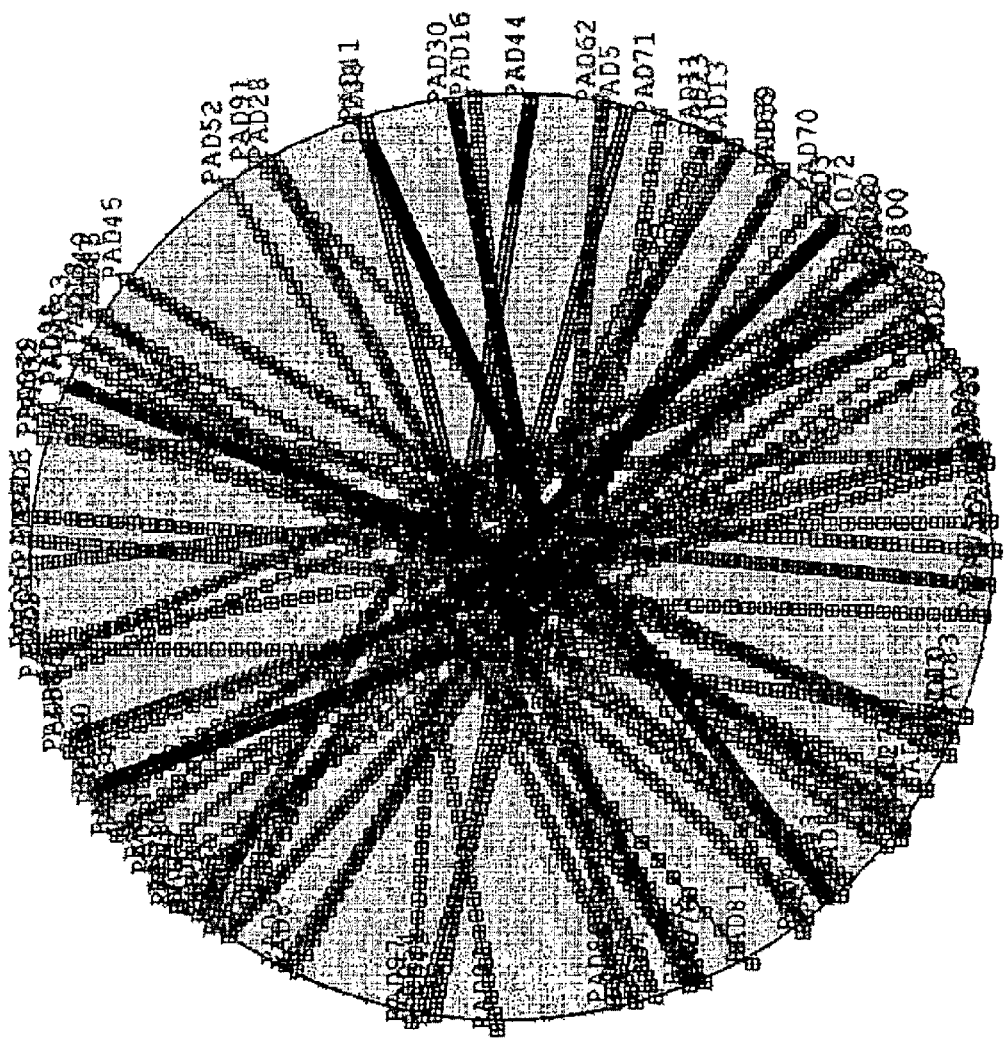
FIG. 9 shows an end view of the charged particle deflections of FIG. 8.
Figure 10:
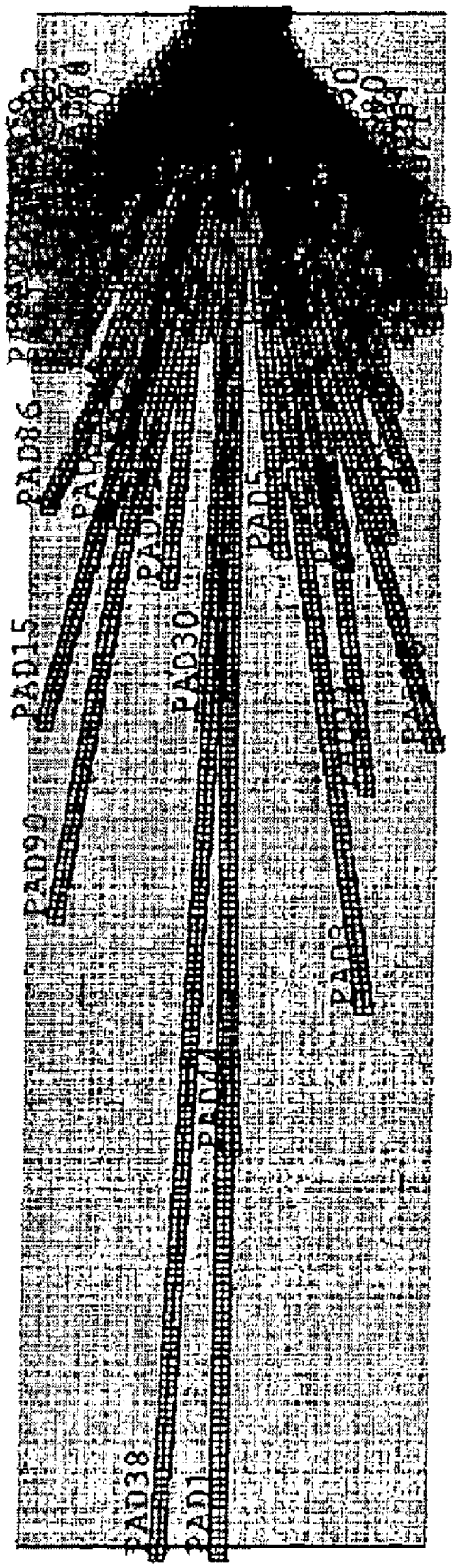
FIG. 10 shows a side view of the charged particle deflections of FIG. 8.

In use, coolant fluid leaving the reactor vessel 12 is fed through the fluid circuit 16 along the flow path 19. The magnetic field arising from the magnetic deflection arrangement 30 interacts with the charged particle products, of nuclear fission reactions in the reactor vessel, which are contained in the coolant fluid stream and the particles are deflected radially outwardly thereby, in the direction of coolant fluid flow 28, toward the internal surface of the flow path defining means 16. FIGS. 6 and 7 of the drawings illustrate the magnetic field and the coercive force field, respectively, for the magnetic deflection arrangement 30 of FIG. 3 of the drawings. FIGS. 8 to 10 illustrate the paths of travel of deflected charged particles in the coolant fluid stream. FIGS. 8 to 10 are for illustrative purposes only, the particles for which deflection pathways are illustrated being simulated particles having masses greater than the atomic masses of known existing elements. It will be appreciated that the magnitude of the force experienced by any particular charged particle, and hence its degree of deflection, will be dependant on the velocity with which the particle moves through the magnetic field applied across the flow path 19 as well as particle properties, such as the particle's mass, charge/degree of ionisation and magnetic moment.

In the embodiment of FIG. 4 of the drawings, the particles deflected toward the internal surface of the inner pipe 18 are propelled into the deposition lining 50. The particles land on the inner graphite layer 54 where they are decelerated. Some particles are embedded within the graphite layer 54, whilst others pass through the layer 54 into the underlying layer 56 of chromium. In particular, silver ions have an affinity for the chromium layer 56. Those particles, which diffuse through the intermediate chromium layer 56, are finally embedded in the outer silicon carbide layer 58 and diffusion of the charged particles through the inner pipe 18 is thus inhibited. The ionised isotopes and other ions are collected and retained in the particle deposition bed 52 comprised by the deposition lining 50 so that the coolant fluid downstream of the deposition bed 52 is purged of these ion or isotope contaminants. In another embodiment of the invention (not shown), the wall of the flow path defining means is of a particle diffusion-resistant material and provides the deposition bed without an internal deposition lining being provided.

In the embodiment of FIG. 5 of the drawings, a deflected charged particle is propelled into one of the series of longitudinally spaced magnetic traps 60 on an internal surface of the flow path defining means 16. Here the particle is displaced in a spiral motion along the endless passage provided by the channel 68, under the influence of the magnetic field generated within the channel 68 by the magnetic internal walls 64 thereof. The fluid stream is thus similarly purged of ionised isotopes and other charged particle contaminants.

The Applicant believes that the nuclear plant 10 and method of the invention will provide an effective means of removing harmful radioactive contaminants from a coolant fluid of a nuclear power plant. This in turn, it is believed, will render maintenance of the fluid circuit components downstream of the particle collection zone/particle deposition bed 52/magnetic trap arrangement 60 in the nuclear plant 10 a safer activity. In particular, in a nuclear plant having a single fluid circuit in which the reactor vessel and power conversion unit are arranged in series, and which operates on a closed direct Brayton cycle, where working/coolant fluid from the reactor vessel passes through the power conversion unit, it is believed that the method/apparatus of the invention will alleviate build-up of particles in the power conversion unit and other downstream components and reduce the need for maintenance thereof. Where the magnetic deflecting arrangement 30 includes electromagnets, it is believed that pulsating the magnetic field will improve the efficiency of removing the charged particles from the coolant fluid. Further, it is believed that by providing angularly off-set pairs of magnets in the magnetic deflecting arrangement 30, the charged particle removal efficiency is improved.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method of removing charged particles from a coolant fluid in a nuclear plant having a reactor vessel and a fluid circuit which includes flow path defining means defining a flow path for circulating the coolant fluid from and to the reactor vessel, the method including
   directing a stream of the coolant fluid and which contains ionized radioactive particles along the flow path;
   applying a pulsating magnetic field of generally constant magnetic flux across a cross-sectional area transverse to a direction of flow of the fluid stream in the flow path by means of at least two pairs of diametrically opposed electromagnets which are arranged adjacent the flow path defining means, the electromagnets of a pair having diametrically opposed inwardly disposed facing poles of opposite polarity and the pairs being arranged so as to have angularly off-set poles of like polarity; and
   deflecting, by means of the pulsating magnetic field, the ionized radioactive particles in the flow path, such that the deflected ionized radioactive particles are embedded in a particle deposition bed defining on an internal surface of the flow path defining means, the particle deposition bed having a plurality of contiguous layers of particle diffusion-resistant deposition material, comprising a radially innermost layer of graphite, a contiguous intermediate layer of at least one of chromium and specialty chromium alloy, and a radially outermost layer of one or more of silicon carbide, diamond, SiN and SiFC.

* * * * *